UNITED STATES PATENT OFFICE.

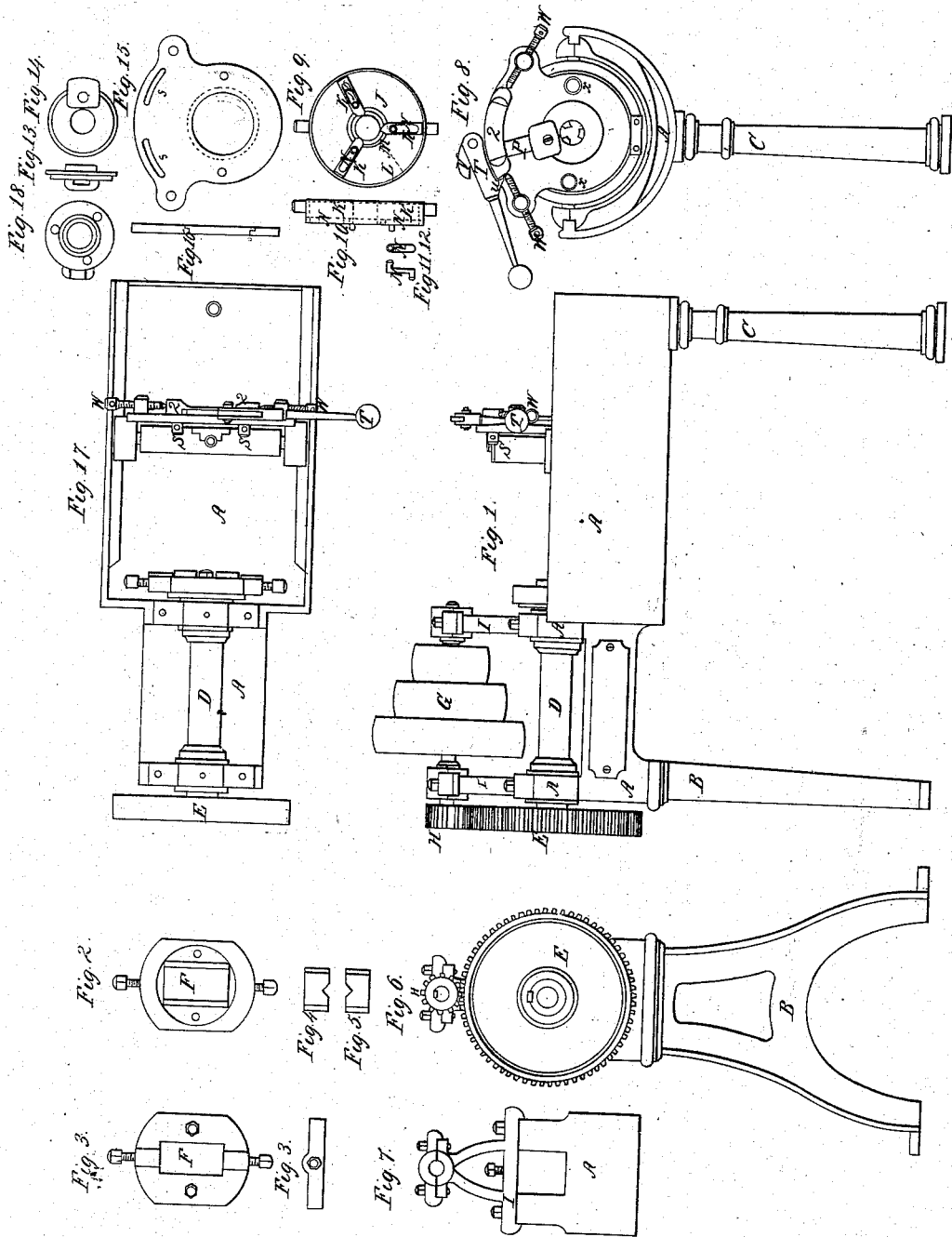

JOHN MOORE, OF MADISON, INDIANA.

SCREW-MACHINE.

Specification of Letters Patent No. 15,932, dated October 21, 1856.

*To all whom it may concern:*

Be it known that I, JOHN MOORE, of the city of Madison, in the county of Jefferson and State of Indiana, have invented a new and useful Improvement in Screw-Cutting Machines or Bolt-Cutters; and I do hereby declare that the following is a full, clear, and exact description of the construction and operation of the same if reference be had to the annexed drawings, making a part of this specification, in which—

Figure 1 is a side elevation of the machine. A is the body of the machine and is one casting of iron. B is a double leg of cast iron and is fastened to the body with two bolts. C is a cast iron column and is secured to the body with one bolt passing through its entire length. D is a cast iron hollow mandrel. At one end the spur wheel E is keyed on to it. At the other end it has a flange of 1 inch thick to which is bolted the chuck, Figs. 2 and 3.

Fig. 2 shows that side of the chuck which is fitted to the flange of the mandrel. It has a circular recess of one-half inch deep and also an oblong slot at F with a recess of one-half inch square along each side, to receive the cast-iron dies shown in Figs. 4 and 5. These dies pinch the bolt and hold it securely while cutting.

Fig. 3 is an outside view of the chuck. G is a cone of pulleys which receives its motion through a belt driven by a similar cone overhead. This cone G is keyed onto a wrought iron shaft whose journals revolve in brackets I. On one end is keyed the pinion H which drives the spur wheel E.

Fig. 6 is a back end elevation of machine.
Fig. 7 shows the form of the end of the body A and of the brackets I.

Fig. 8 is a front end elevation of machine with the die chuck and vibrating motion. The body at that end as shown is semicircular with a strip at the end of 2 inches deep tapering to a point at the sides for the purpose of holding oil to feed the machine with while cutting.

Fig. 9 represents the die chuck with the front apparatus as shown in Fig. 8 removed. It is made of cast iron. J is the chuck. K K K are 3 steel dies accurately fitted into 3 grooves planed in the chuck. The surface of the chuck from L to M is sunk in leaving a projecting ring at L and another at M of $\frac{5}{16}$ deep. (See Fig. 10, represented by dotted lines.) The face of the dies K is even with the bottom of this sunken part for the purpose of admitting the links M. (See Figs. 11 and 12.) A hole is drilled in near the end of each die to fit one end of each link. The face of these links is thus even with the face of the rings L and M. The dies and links being in the position as shown in Fig. 9 it is ready for the front apparatus to be bolted to it, which consists of 2 plates, an external and an internal one. The internal plate has a rabbet on its outer edge. (See Figs. 13 and 14.) The external plate has a rabbet on its internal edge to correspond. (See Figs. 15 and 16.) When these 2 plates are put together and the external plate bolted to the chuck the internal plate is held firmly to the face of the chuck and yet admits freely of a rotary motion. The internal plate has 3 holes drilled in it to receive the upturned ends of the links N; also, a boss or projection on it with a slot through it, (see Figs. 14 and 18 and 13,) into which is fitted firmly the bar P and secured by a countersunk headed screw. (See Fig. 8.) The arc 2 acts as a guide and stop for this bar. The arc 2 is held in its place by 2 bolts passing through the slots s. On the top end of the bar P is fitted the lever T with a hinge joint. The bar P and consequently the internal plate are actuated by lifting up or drawing forward the lever T. On this lever is a catch u which when drawn forward as seen in Fig. 8 secures the internal plate in its position while cutting a bolt. When it is desired to release the dies the lever T is lifted up and striking the catch V on the top of the bar P the internal plate is moved part around the links n, throw the dies open and the bolt is free. By simply drawing forward the lever T it is set ready for the next bolt. By means of the set bolts W acting upon the arc 2 the dies may be set to any required size. When a new set of dies are fitted in the arc 2 does not stand in the position as shown at Fig. 8 but is thrown back to the right-hand side as far as it will go. This allows the dies to be made all the length the chuck will take in and thus they may be recut till they become three fourths of an inch shorter before they are worn out. The arc 2 would then stand on the left hand side. When it is necessary to change the dies we have merely to throw the arc back to the right, take out the 2 bolts x, remove the front apparatus, take out the links and then the dies, put in the dies required, insert the links, be careful to leave them in a line with the dies, and then the front plate will drop on all the links easily. The same 3 links are used for all the dies belonging to the machine.

Fig. 17 is a plan view.

In this machine no backing motion is required and as a natural consequence the dies are not so liable to nip and they wear much longer.

The machine I have in operation will cut any bolt from ½ inch up to 1½ inches. The annexed drawings are one eighth its size. It will cut 100 common ¾ bolts per hour or 24 bolts per hour of 1¼ in. diameter and 6 inches of thread on each bolt.

I do not claim the peculiar shape of that part of the body which is semicircular. That is not new. I do not claim the vibrating motion of the die chuck. That is old. I do not claim the peculiar shape of the dies.

What I claim and desire to secure by Letters Patent is:

Operating the cutters in the die box by means of the links N, the internal and external plates as described in connection with the bar P, the arc Q, the lever T and set bolts W in the manner and for the purpose set forth.

JOHN MOORE.

Witnesses:
J. M. CRAWFORD,
W. W. DAVIDSON.